United States Patent
Yoo

(10) Patent No.: US 7,042,676 B2
(45) Date of Patent: May 9, 2006

(54) HARD DISK CLAMPING APPARATUS

(75) Inventor: Yong-chul Yoo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 208 days.

(21) Appl. No.: 10/712,276

(22) Filed: Nov. 14, 2003

(65) Prior Publication Data

US 2004/0095673 A1    May 20, 2004

(30) Foreign Application Priority Data

Nov. 19, 2002    (KR)    ...................... 10-2002-0071966

(51) Int. Cl.
*G11B 17/02* (2006.01)
(52) U.S. Cl. ................................. 360/99.12
(58) Field of Classification Search ............. 360/99.12; 720/604, 704, 706, 723, 724
See application file for complete search history.

(56) References Cited

U.S. PATENT DOCUMENTS

| | | | |
|---|---|---|---|
| 4,470,137 A * | 9/1984 | Tago ........................... | 369/100 |
| 5,731,927 A * | 3/1998 | Kaneko ..................... | 360/98.08 |
| 5,761,186 A * | 6/1998 | Mushika et al. ............ | 720/704 |
| 6,836,461 B1 * | 12/2004 | Baum et al. .............. | 360/99.12 |
| 2002/0163877 A1 * | 11/2002 | Carstensen .................. | 369/281 |
| 2003/0112552 A1 * | 6/2003 | Choo et al. ............... | 360/99.12 |
| 2005/0099723 A1 * | 5/2005 | Momoi ...................... | 360/99.12 |
| 2005/0264929 A1 * | 12/2005 | Sato et al. ............... | 360/99.12 |

FOREIGN PATENT DOCUMENTS

| | | | |
|---|---|---|---|
| GB | 2093625 A | * | 9/1982 |
| JP | 402216685 A | * | 8/1990 |
| JP | 7-262750 | | 10/1995 |
| JP | HEI 9-91816 | | 4/1997 |
| JP | HEI 10-162464 | | 6/1998 |
| JP | 2000-195212 | | 7/2000 |
| KR | 1999-29337 | | 7/1999 |

OTHER PUBLICATIONS

Korean Office Action for corresponding Korean Application No. 2002-71966 dated Nov. 22, 2004.

* cited by examiner

*Primary Examiner*—Allen Cao
(74) *Attorney, Agent, or Firm*—Staas & Halsey LLP

(57) ABSTRACT

An apparatus for clamping a hard disk includes a motor rotating body having a boss inserted in a central hole of the hard disk and having a threaded portion formed on an outer circumferential surface of the boss and an accommodation surface supporting part a lower surface of the hard disk, a clamping washer inserted around the boss of the motor rotating body and placed on an upper surface of the hard disk, and a clamping nut placed on the clamping washer and coupled to the threaded portion of the boss so as to clamp the hard disk between the clamping washer and the accommodation surface of the rotating body.

13 Claims, 6 Drawing Sheets

HARD DISK CLAMPING APPARATUS

CROSS-REFERENCE TO RELATED APPLICATIONS

This application claims the priority of Korean Patent Application No. 2002-71966 filed on Nov. 19, 2002 in the Korean Intellectual Property Office, the disclosure of which is incorporated herein by reference.

BACKGROUND OF THE INVENTION

1. Field of the Invention

An aspect of the present invention relates to an apparatus for clamping a hard disk on a motor.

2. Description of the Related Art

In a conventional hard disk drive, as shown in FIG. 1, a hard disk D where predetermined information is recorded is fixed on a motor rotating body 4 by a predetermined clamping apparatus to be capable of rotating. An actuator 2 on which a magnetic head 2a is mounted and rotating around a rotation shaft 2b provided on a base 1 is provided at one side of the hard disk D. When information is recorded and reproduced with respect to the hard disk D, the motor rotating body 4 rotates, which causes the hard disk D to rotate. The actuator 2 moves the magnetic head 2a to a desired position on a track of the hard disk D so that the recording and reproduction processes can be performed.

In FIGS. 1 and 2, the clamping apparatus for fixing the hard disk D on the motor rotating body 4, comprises a spacer 5 inserted around a boss 4a of the motor rotating body 4 disposed on an upper surface of the hard disk D, a damper 3 accommodated on the spacer 5, and a plurality of screws 6 for coupling the damper 3 to the motor rotating body 4. Thus, when the plurality of screws 6 are coupled to coupling holes 4c of the motor rotating body 4 through through holes 3a of the damper 3, an edge portion of the damper 3 presses the spacer 5 by a screwing force. Then, the spacer 5 presses the hard disk D toward an accommodation surface 4b of the motor rotating body 4 so that the hard disk D is fixed on the motor rotating body 4. The above clamping structure using a plurality of screws 6 is disclosed in Japanese Patent Publication No. hei 9-91816, Japanese Patent Publication No. hei 10-162464, and Japanese Patent Publication No. 2000-195212.

However, when the plurality of screws 6 are screwed too tightly, a displacement is generated to the hard disk D receiving the screwing force so that deviation in the height at which the magnetic head 2a is lifted may be severe.

A servo signal such as information about the position where information is to be stored is recorded on the hard disk D. In some cases, a servo signal is recorded after the hard disk D is assembled. However, in other cases, a servo signal is first recorded on the hard disk D and then the hard disk D is assembled. Accordingly, when a displacement is generated to the hard disk D during assembly, the servo signal already recorded on the hard disk D may be damaged. Also, abrasion dust can be generated from the plurality of screws 6, an inner wall of the through hole 3a of the damper 3, or an inner wall of the coupling hole 4c of the motor rotating body 4, which may damage the surface of the hard disk D. Furthermore, since four screws 6 need to be screwed several times one by one in order to apply an identical pressing force to each screw, working time is prolonged.

Therefore, a new clamping structure which can overcome these problems is needed.

SUMMARY OF THE INVENTION

Accordingly, it is an aspect of the present invention to provide an apparatus for clamping a hard disk which can firmly and quickly clamp a hard disk while preventing deformation of the hard disk.

Additional aspects and/or advantages of the invention will be set forth in part in the description which follows, and in part, will be obvious from the description, or may be learned by practice of the invention.

The foregoing and/or other aspects of the present invention are achieved by providing an apparatus for clamping a hard disk. The apparatus comprises a rotating body having a boss inserted in a central hole of the hard disk and having a threaded portion formed on an outer circumferential surface of the boss and an accommodation surface to support a lower surface of the hard disk; a clamping washer inserted around the boss of the rotating body and placed on an upper surface of the hard disk; and a clamping nut placed on the clamping washer and coupled to the threaded portion of the boss so as to clamp the hard disk between the clamping washer and the accommodation surface of the rotating body.

BRIEF DESCRIPTION OF THE DRAWINGS

The above and/or other features and advantages of the invention will become apparent and more readily appreciated from the following description of the preferred embodiments taken in conjunction with the accompanying drawings of which.

DETAILED DESCRIPTION OF THE PREFERRED EMBODIMENTS

Figure 1:
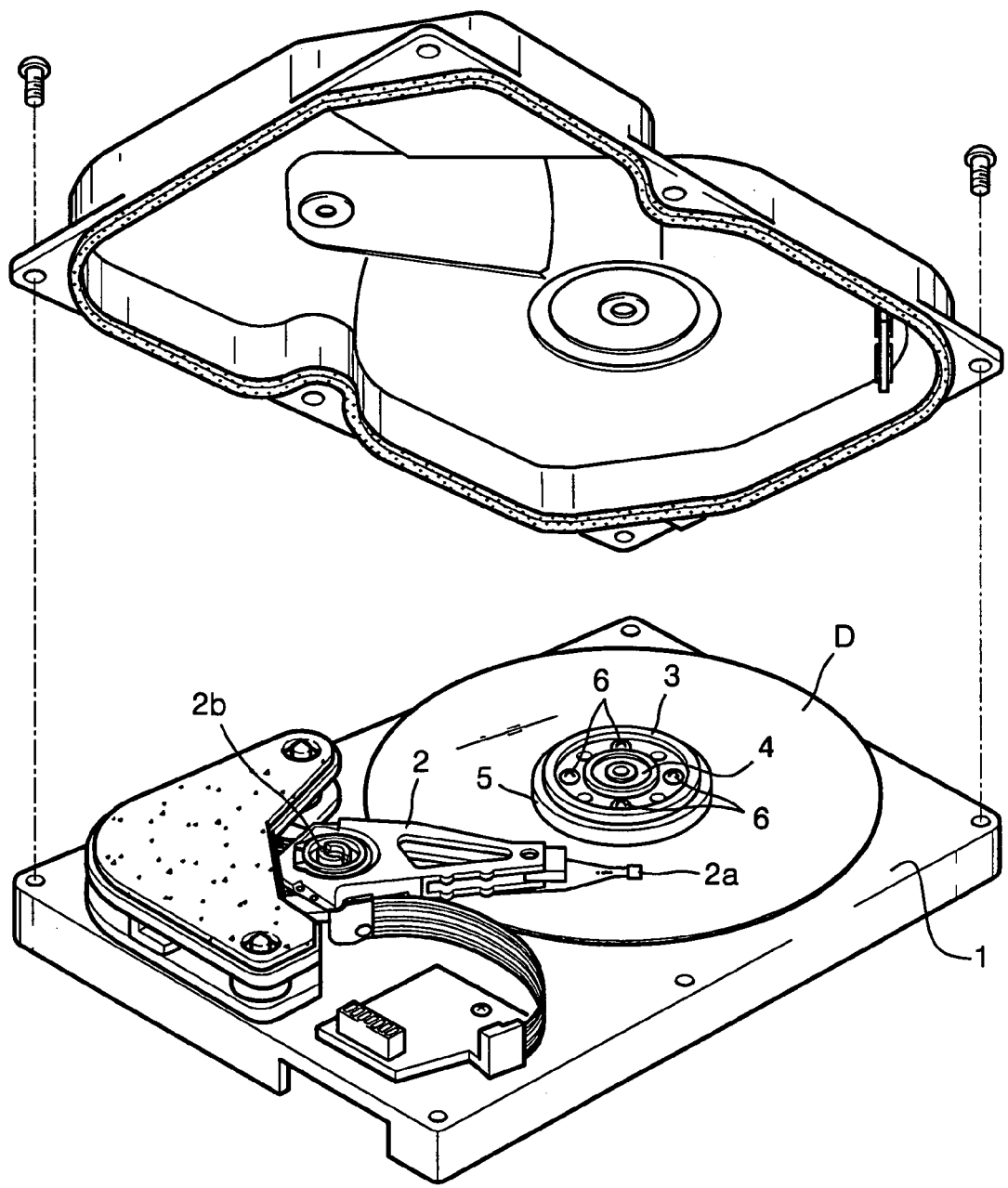
FIG. 1 is a perspective view illustrating a hard disk drive adopting a conventional hard disk clamping apparatus.
Figure 2:
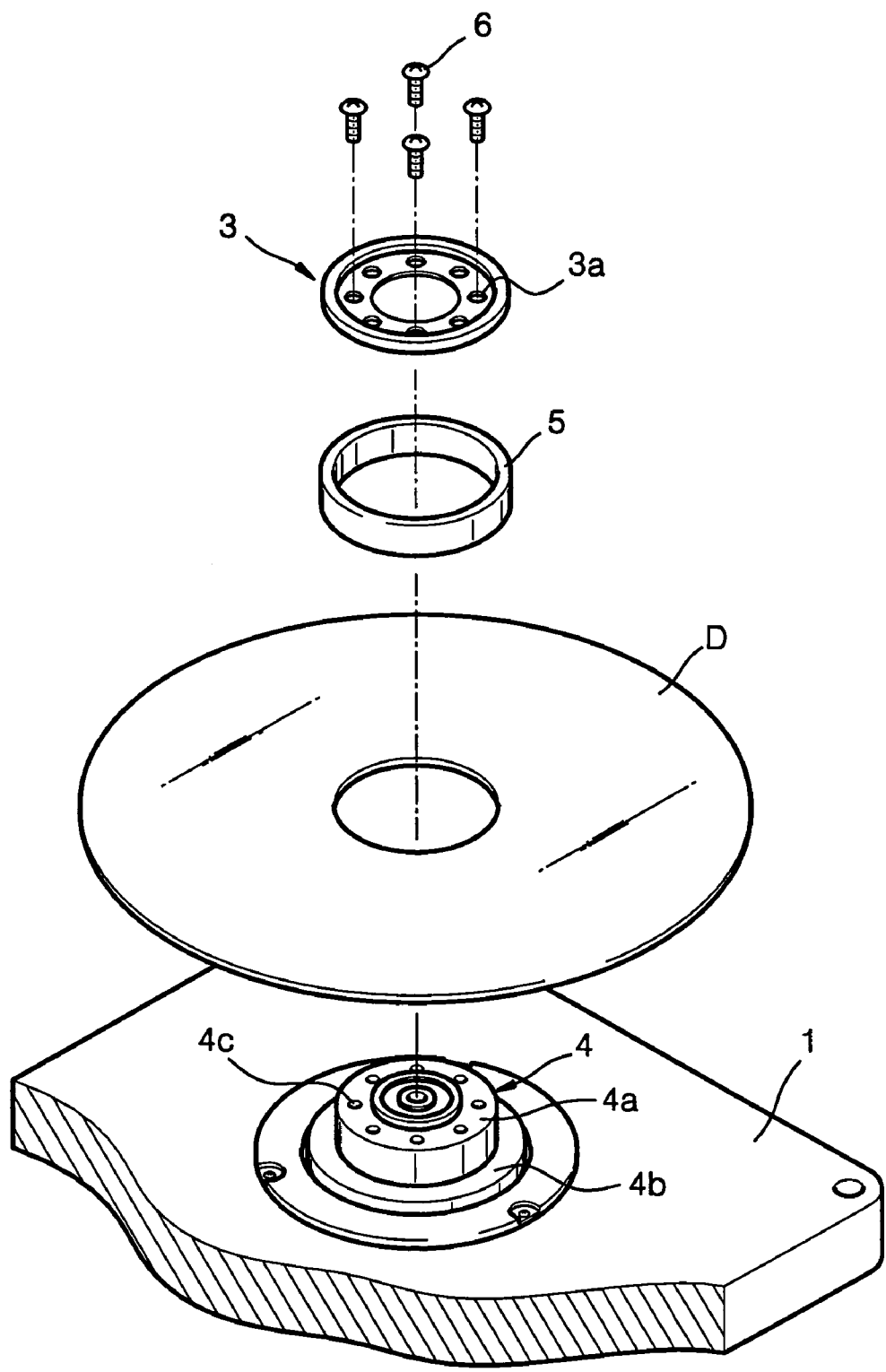
FIG. 2 is an exploded perspective view illustrating the hard disk clamping apparatus shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
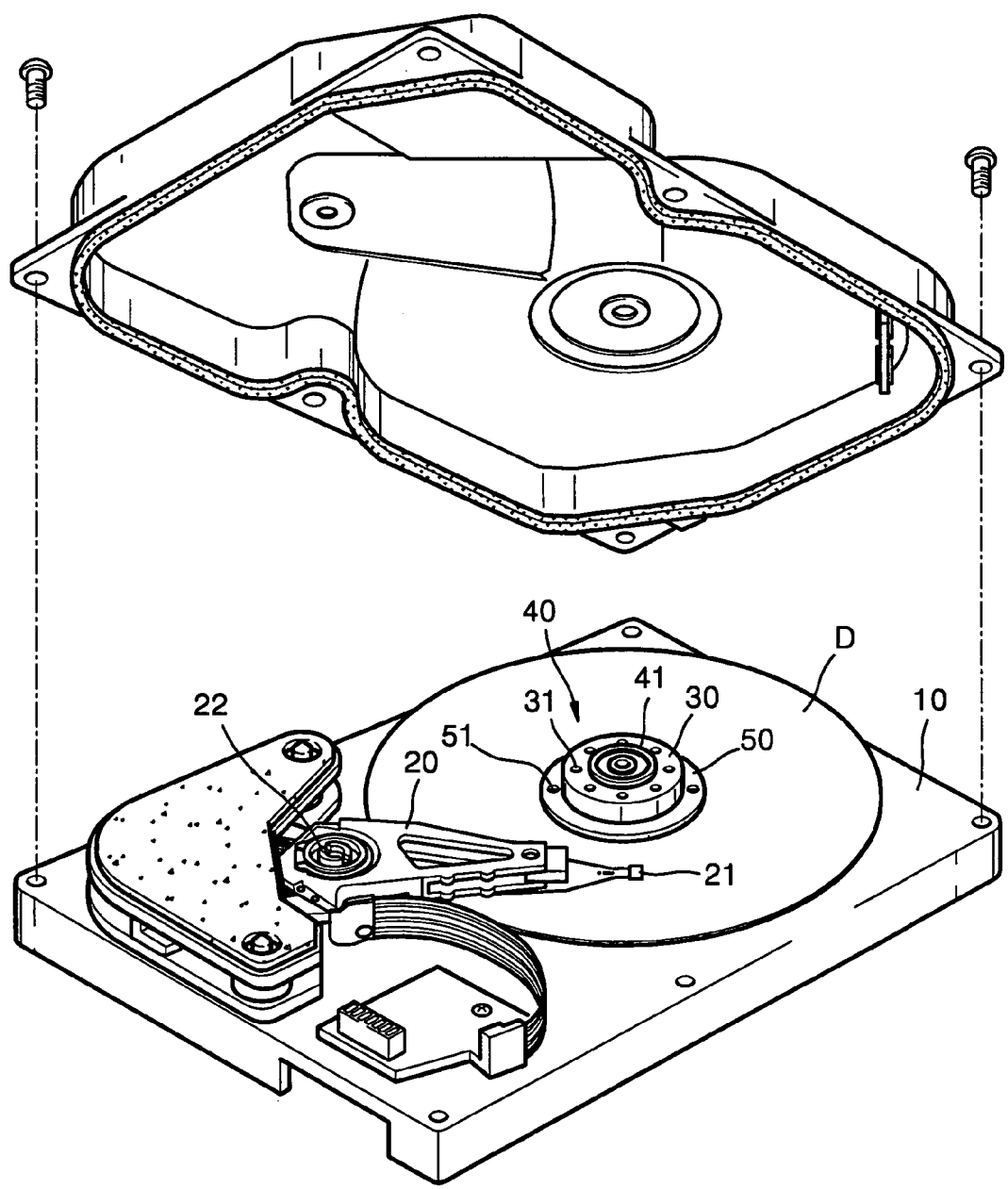
FIG. 3 is a perspective view illustrating a hard disk drive adopting a hard disk clamping apparatus according to an embodiment of the present invention.

Referring to FIG. 3, a hard disk drive comprising a hard disk D, and an actuator 20 having a magnetic head 21 for recording and reproducing information with respect to the hard disk D and rotating around a rotation shaft 22 provided on the base 10. When a recording/reproduction process is initiated, the actuator 20 moves to a predetermined position of the hard disk D to perform the recording and reproduction processes.

Figure 4:
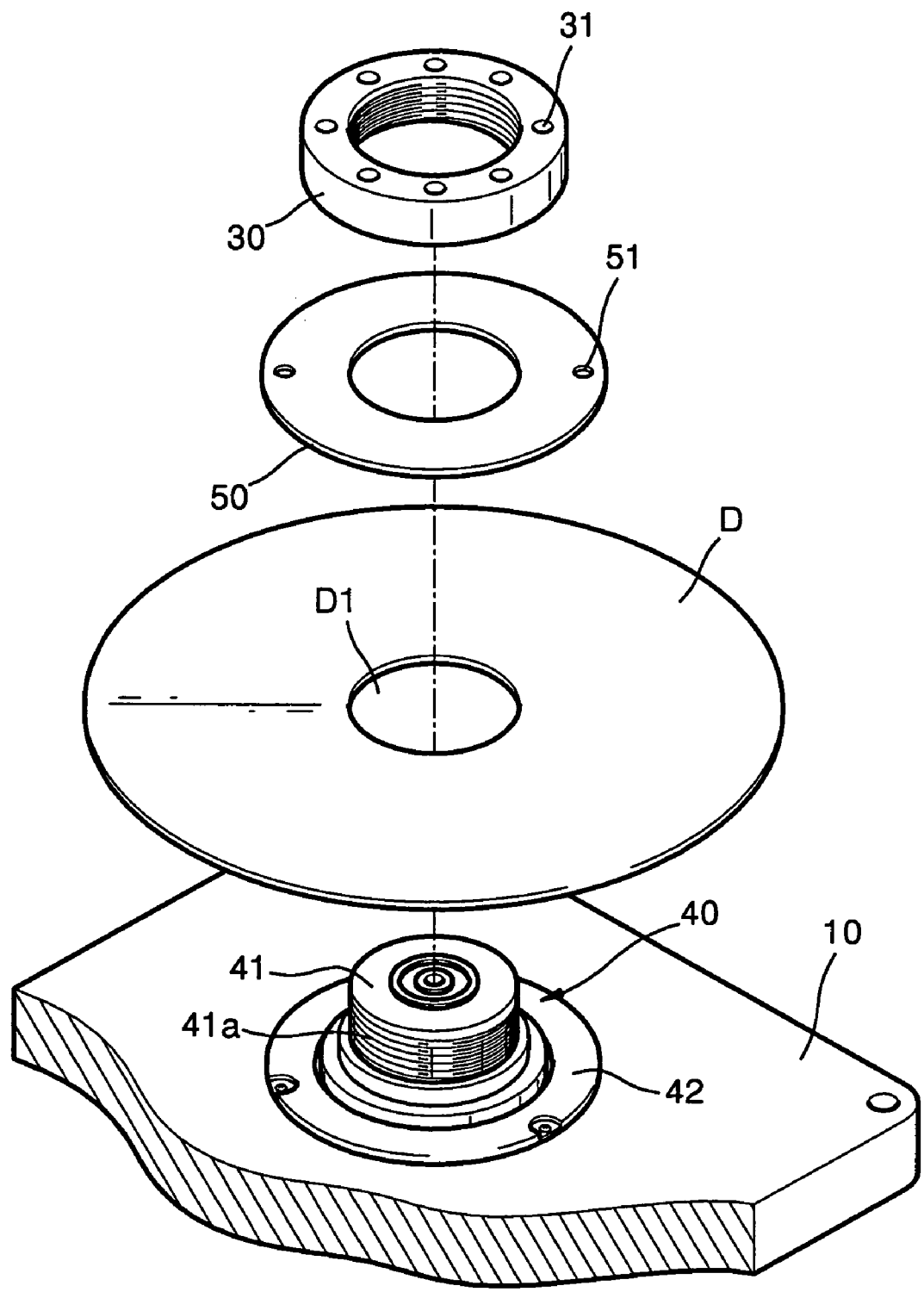
FIG. 4 is an exploded perspective view illustrating the hard disk clamping apparatus shown in FIG. 3.

A clamping apparatus for clamping the hard disk D, as shown in FIGS. 3 and 4, comprises a motor rotating body 40, a clamping washer 50, and a clamping nut 30. The motor rotating body 40 comprises a boss 41 inserted in a center hole D1 of the hard disk D, and an accommodation surface 42 on which a lower surface of the hard disk D around the center hole D1 is closely placed. A threaded portion 41a for screw coupling is formed on an outer circumferential surface of the boss 41. The clamping washer 50 having a ring shape is inserted around the boss 41 of the motor rotating body 40 and placed on an upper surface of the hard disk D placed on the accommodation surface 42. Also, the clamping nut 30 having a ring shape is coupled to the threaded portion 41a on the clamping washer 50. Thus, as the clamping nut 30 is coupled to the boss 41, the clamping washer 50 is pressed against the hard disk D. Consequently, the hard disk D is clamped between the clamping washer 50 and the accommodation surface 42 of the motor rotating body 40.

Figure 5A:
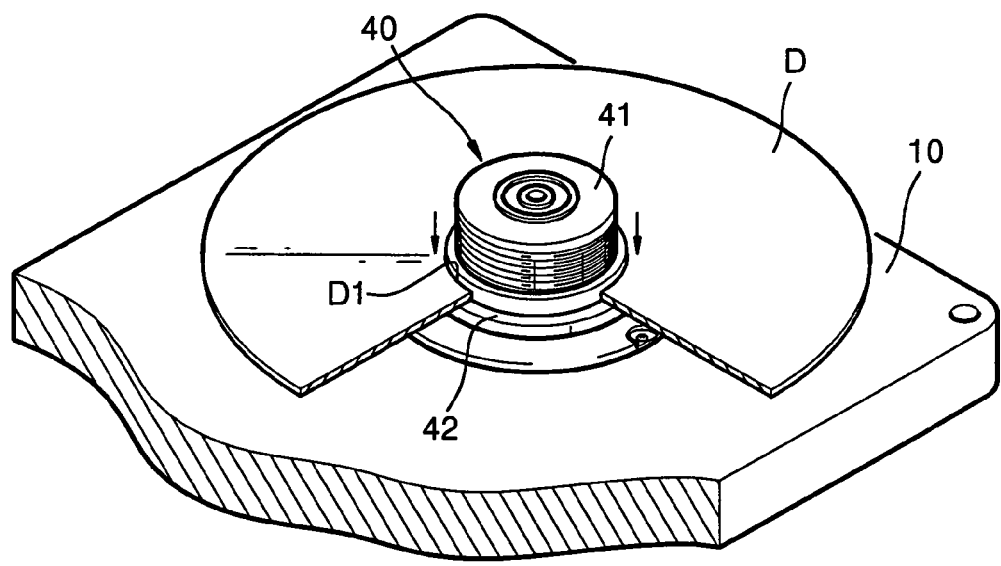
FIGS. 5A through 5D are views depicting a sequential fixing process of a hard disk using the hard disk clamping apparatus shown in FIG. 4.
Figure 5B:
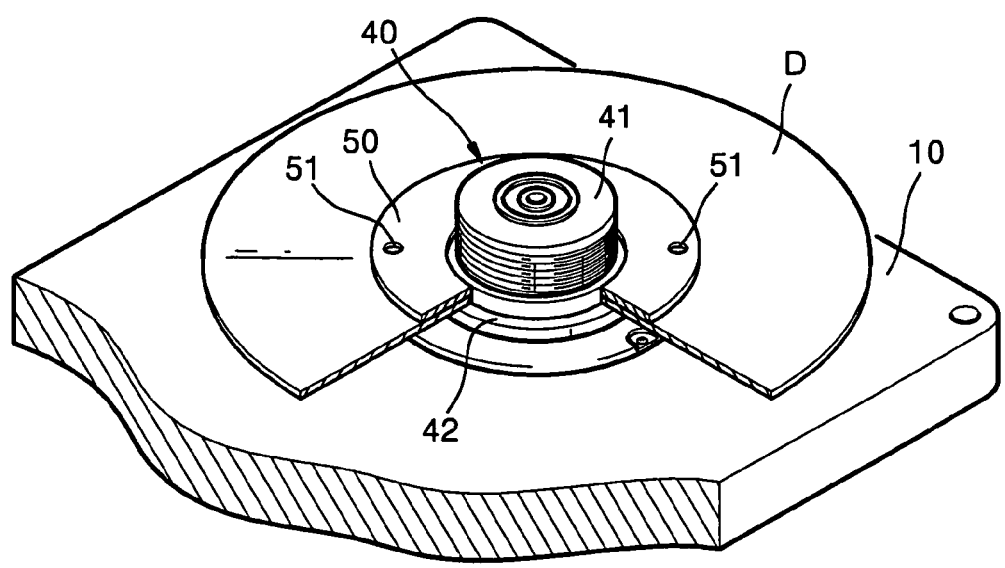
Figure 5C:
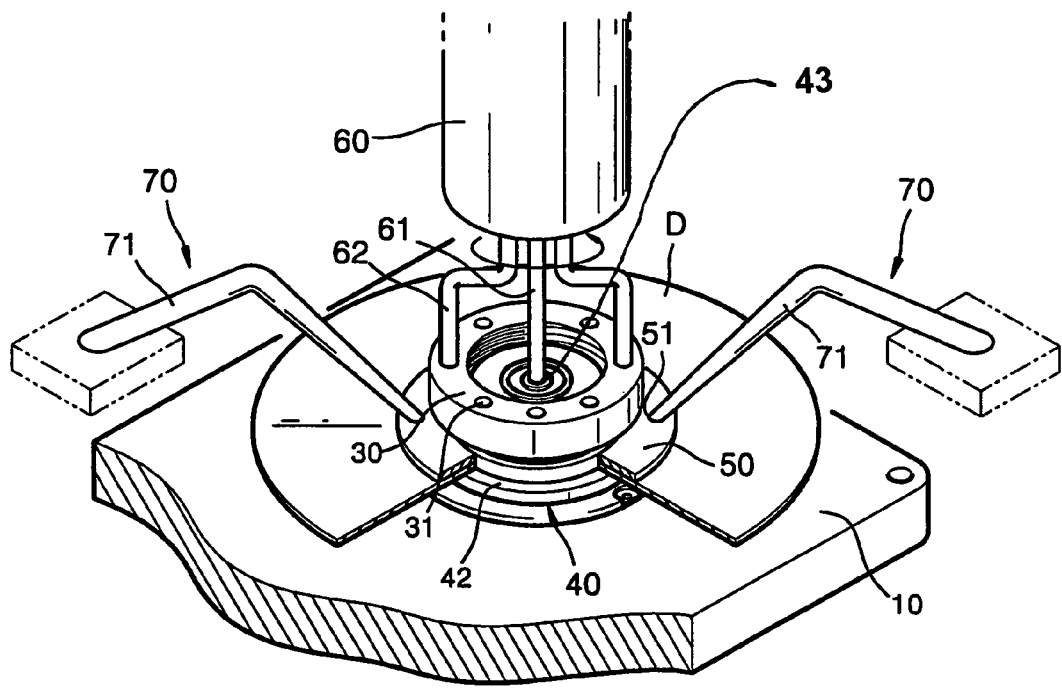
Figure 5D:
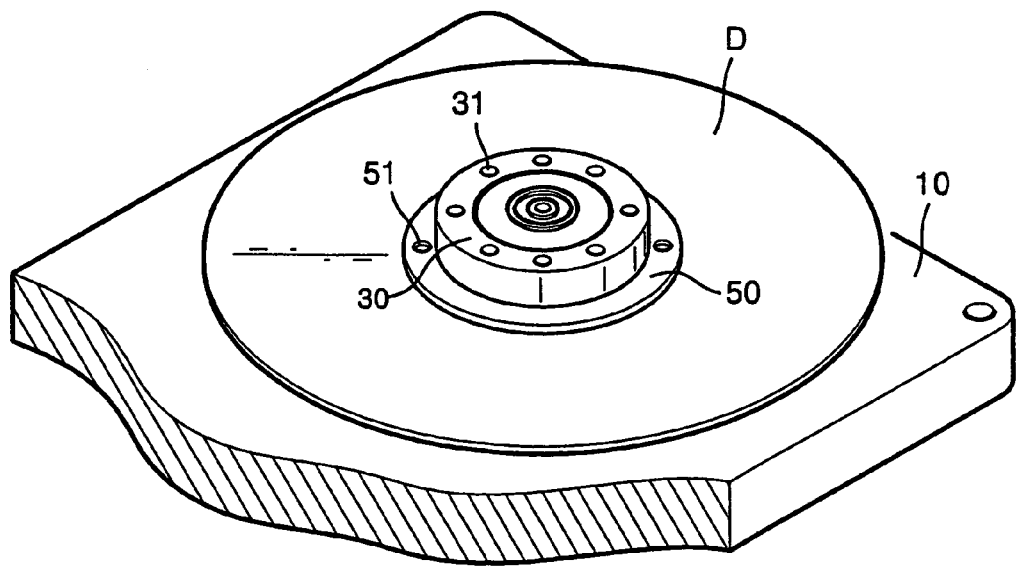

In the fixing process of the hard disk D using the clamping apparatus having the above structure, the hard disk D is placed on the motor rotating body 40 rotatably installed on the base 10, as shown in FIG. 5A. The boss 41 of the motor rotating body 40 protrudes through the central hole D1 of the hard disk D and the lower surface of the hard disk D is accommodated on the accommodation surface 42. Next, the clamping washer 50 is inserted around the boss 41 to be disposed on the upper surface of the hard disk D, as shown in FIG. 5B. Then, the clamping nut 30 is coupled to the threaded portion 41 a of the boss 41, as shown in FIG. 5C. A predetermined jig, as shown in FIG. 5C, may be used to facilitate the coupling process. First, fixing pins 71 of a washer fixing jig 70 are inserted into a plurality of grooves 51 formed on the clamping washer 50 to fix the clamping washer 50 during the coupling process. If the clamping washer 50 is rotated together with the clamping nut 30 during the coupling process, the clamping washer 50 will frictionally contact with the upper surface of the hard disk D and dust will be generated. The use of the jig can prevent the generation of dust. After the clamping washer 50 is fixed, the clamping nut 30 having a ring shape is coupled using an electric driver 60. The electric driver 60 comprises a fixing portion 61 inserted in a central hole 43 formed at the center portion of the boss 41, and rotating portions 62 which are rotated by being inserted into a plurality of holes 31 formed on a horizontal surface of the clamping nut 30. Thus, when the electric driver 60 is driven after the fixing portion 61 of the electric driver 60 is inserted in the central hole 43 and the rotating portions 62 are inserted into each of the holes 31 of the clamping nut 30, the rotating portions 62 are rotated and the clamping nut 30 is rotated and coupled to the threaded portion 41a of the boss 41 (shown in FIG. 4). Then, the clamping nut 30 presses the clamping washer 50 against the hard disk D so that the hard disk D is firmly clamped between the clamping washer 50 and the accommodation surface 42, as shown in FIG. 5D.

As a result, since the clamping is completed by sequentially placing the clamping washer 50 and the clamping nut 30 on the hard disk D and rotating the clamping nut 30 using the jig, a hard disk fixing process can be quickly and conveniently performed compared to the convention method in which a plurality of screws are screwed into the through holes of the damper one by one.

Although only two rotating portions 62 of the electric driver 60 to rotate the clamping nut 30 are provided, more than two holes 31 are formed on the clamping nut 30. Therefore, the rotating portions 62 of the electric driver 60 may be inserted at any angle, but also can be used effectively to correct imbalance of the rotating body. Since there are at least two holes in which the rotating portions 62 are inserted, a mass body is inserted in an appropriate position among the remaining holes to move the center of gravity so that imbalance can be corrected by adjusting the center of gravity.

The bottom surface of the groove 51 of the clamping washer 50 is closed unlike that of the hole 31 which is a through hole. When the clamping nut 30 is screwed, dust can be generated due to friction between the clamping nut 30 and the clamping washer 50. If the groove 51 is a through hole, dust may form on the hard disk D through the hole. Thus, the groove 51 of the clamping washer 30 is not a through hole.

Since the clamping is completed by sequentially placing the clamping washer and the clamping nut on the hard disk and rotating the clamping nut, working time can be remarkably reduced compared to the conventional technology in which the hard disk is clamping by screwing a plurality of screws.

Also, since screws are not used, the possibility of the dust generated during the coupling process adhering to the hard disk can be lowered.

And since a uniform pressure is applied to the hard disk via the clamping washer during the clamping process, the possibility of the hard disk being damaged can be lowered.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for clamping a hard disk, comprising:
a motor rotating body having a boss inserted in a central hole of the hard disk and having a threaded portion formed on an outer circumferential surface of the boss and an accommodation surface to support a lower surface of the hard disk;
a clamping washer inserted around the boss of the rotating body and placed on an upper surface of the hard disk; and
a clamping nut placed on the clamping washer, coupled to the threaded portion of the boss and having a jig interface used to screw the nut and clamp the hard disk between the clamping washer and the accommodation surface of the rotating body.

2. The apparatus of claim 1, wherein the clamping nut is screwed onto the threaded portion of the boss so as to clamp the hard disk between the clamping washer and the accommodation surface of the rotating body.

3. An apparatus for clamping a hard disk, comprising:
a motor rotating body having a boss inserted in a central hole of the hard disk and having a threaded portion formed on an outer circumferential surface of the boss and an accommodation surface to support a lower surface of the hard disk;
a clamping washer inserted around the boss of the rotating body and placed on an upper surface of the hard disk; and
a clamping nut placed on the clamping washer and coupled to the threaded portion of the boss so as to clamp the hard disk between the clamping washer and the accommodation surface of the rotating body and wherein a plurality of holes are formed on a horizontal surface of the clamping nut so that the clamping nut is rotatable by inserting a predetermined jig in the plurality of holes.

4. The apparatus of claim 3, wherein the number of the holes are greater than the number of the holes required for the insertion of the predetermined jig.

5. The apparatus of claim 3, wherein an outer circumferential surface of the clamping nut has a ring shape.

6. An apparatus for clamping a hard disk, comprising:
a motor rotating body having a boss inserted in a central hole of the hard disk and having a threaded portion formed on an outer circumferential surface of the boss and an accommodation surface to support a lower surface of the hard disk;
a clamping washer inserted around the boss of the rotating body and placed on an upper surface of the hard disk; and
a clamping nut placed on the clamping washer and coupled to the threaded portion of the boss so as to clamp the hard disk between the clamping washer and the accommodation surface of the rotating body, and wherein a plurality of grooves are formed on a horizontal surface of the clamping washer so that, by fixedly inserting a predetermined jig in the grooves, the rotation of the clamping washer is prevented during the coupling of the clamping nut.

7. The apparatus of claim 6, wherein a bottom surface of each of the grooves is closed.

8. A method of clamping a hard disk, comprising:
positioning a hard disk drive on a motor rotating body rotatably installed on a base wherein a boss of the motor rotating body protrudes from a central hole of the hard disk;
inserting a clamping washer around the boss;
coupling a clamping nut to a threaded portion of the boss; and
tightening the nut using a jig interface of the nut.

9. A method of clamping a hard disk, comprising:
positioning a hard disk drive on a motor rotating body rotatably installed on a base wherein a boss of the motor rotating body protrudes from a central hole of the hard disk;
inserting a clamp washer around the boss;
coupling a clamping nut to a threaded portion of the boss;
inserting a plurality of fixing pins of a washer jig into a groove formed on the clamping washer; and
fixing the clamping washer to an upper surface of the hard disk.

10. A method of clamping a hard disk, comprising:
positioning a hard disk drive on a motor rotating body rotatably installed on a base wherein a boss of the motor rotating body protrudes from a central hole of the hard disk;
inserting a clamp washer around the boss; and
coupling a clamping nut to a threaded portion of the boss, wherein the coupling of the clamping nut using to the threaded portion of the boss comprises:
inserting a fixing portion of an electric driver into a central hole formed at a center portion of the boss;
inserting a plurality of rotating portions into a plurality of holes formed on a horizontal surface of the clamping nut; and
rotating the plurality of rotating portions so as to rotate the clamping nut which results in coupling the clamping nut to the threaded portion of the boss.

11. An apparatus for clamping a hard disk, comprising:
a motor rotating body having a boss inserted in a central hole of the hard disk and having a threaded portion formed on an outer circumferential surface of the boss and an accommodation surface to support a lower surface of the hard disk;
a clamping washer inserted around the boss of the rotating body and placed on an upper surface of the hard disk;
a clamping nut placed on the clamping washer and coupled to the threaded portion of the boss so as to clamp the hard disk between the clamping washer and the accommodation surface of the rotating body wherein a plurality of holes are formed on a horizontal surface of the clamping nut so that the clamping nut is rotatable by inserting a predetermined jig in the plurality of holes;
a fixing portion inserted in a central hole formed at a center portion of the boss; and
a plurality of rotating portions which are rotated by being inserted into the plurality of holes formed on the horizontal surface of the clamping nut.

12. An apparatus for clamping a hard disk, comprising:
a motor rotating body having a boss inserted in a central hole of the hard disk and having a threaded portion formed on an outer circumferential surface of the boss and an accommodation surface to support a lower surface of the hard disk;
a clamping washer inserted around the boss of the rotating body and placed on an upper surface of the hard disk;
a clamping nut placed on the clamping washer and coupled to the threaded portion of the boss so as to clamp the hard disk between the clamping washer and the accommodation surface of the rotating body, and
wherein a plurality of grooves are formed on a horizontal surface of the clamping washer so that, by fixedly inserting a predetermined jig in the grooves, the rotation of the clamping washer is prevented during the coupling of the clamping nut; and
a plurality of fixing pins to be inserted into the plurality of grooves to fix the clamping washer to an upper surface of the hard disk.

13. An apparatus for clamping a hard disk comprising:
a boss inserted in a central hole of the hard disk having a threaded portion formed on an outer circumferential surface of the boss;
a clamping washer inserted around the boss and placed on an upper surface of the hard disk; and
a clamping nut placed on the clamping washer and having a jig interface used to screw the nut onto the threaded portion of the boss.

* * * * *